United States Patent [19]

Nelson et al.

[11] Patent Number: 4,980,110

[45] Date of Patent: Dec. 25, 1990

[54] METHOD OF FORMING A CROSS LINKED FOAMED POLYOLEFIN COMPOSITE ARTICLE

[75] Inventors: Donald E. Nelson, Adrian, Mich.; James E. Lammy, Sr., Napoleon, Ohio

[73] Assignee: Ohio Cellular Products, Inc., Wauseon, Ohio

[21] Appl. No.: 180,824

[22] Filed: Apr. 12, 1988

[51] Int. Cl.$^5$ .................. B29C 43/18; B29C 43/20
[52] U.S. Cl. .................... 264/152; 264/160; 264/241; 264/247; 264/273; 264/321
[58] Field of Search ............ 264/321, 276, 279.1, 264/152, 160, 241, 247, 273

[56] References Cited

U.S. PATENT DOCUMENTS

| | | | |
|---|---|---|---|
| 1,978,985 | 10/1934 | Coff | 264/276 |
| 3,954,537 | 5/1976 | Alther et al. | 156/82 |
| 4,193,957 | 3/1980 | Kauffman et al. | 264/321 |
| 4,307,471 | 12/1981 | Lovell | 2/411 |
| 4,315,050 | 2/1982 | Rourke | 428/116 |
| 4,326,303 | 4/1982 | Rappleyea | 2/411 |
| 4,327,049 | 4/1982 | Miller | 264/321 |
| 4,575,470 | 3/1986 | Fakirov et al. | 428/105 |
| 4,595,551 | 6/1986 | Maurer | 264/321 |
| 4,676,041 | 6/1987 | Ford | 264/279.1 |

OTHER PUBLICATIONS

Cross-Linked Polyolefin Foams, Journal of Cellular Plastics, William M. Allen, Jan.-Feb. 1984.
Trocellen Cross-Linked Polyethylene Foam the New Fashion in foams for the 1980's—Dynamit Nobel of america Inc.

Primary Examiner—James Lowe
Attorney, Agent, or Firm—Neuman, Williams, Anderson & Olson

[57] ABSTRACT

A method for forming soft, resilient, smooth, energy dissipating articles from foamed partially cross-linked polyolefins wherein sheet stock is cut into a preform and the preform while at room temperature is positioned within a mold cavity formed by partible mold halves. The preforms and the cavity of the molds are so arranged and constructed that after molding there is no flashing needing trimming because the polyolefin is substantially confined within the cavity without any lateral projection into the parting surfaces of the mold.

23 Claims, 4 Drawing Sheets

METHOD OF FORMING A CROSS LINKED FOAMED POLYOLEFIN COMPOSITE ARTICLE

TECHNICAL FIELD

The present invention relates to the manufacture of cushioning, or energy absorbing, materials such as, for example, that traditionally used in athletic equipment. Even more particularly the present invention relates to methods of molding a moldable, cross-linked, foamed polyolefin. The present invention is also directed to methods for producing tenaciously bonded laminates of cross-linked closed-cell foamed polyolefin in which one of the laminate layers has a density different than the other laminate layer.

BACKGROUND ART

Articles have been manufactured in the past from foamed, cross-linked polyolefin wherein such articles were intended for use as shock absorbing, or cushioning members, in a wide variety of applications, including athletic equipment. Such members have been manufactured by others by a process wherein a panel, or sheet-stock, of foamed cross-linked polyolefin (FXLPO), particularly polyethylene, is heated to an elevated temperature and this preheated material then manually positioned within a mold in such manner that a peripheral portion is clamped and sealed in the parting line of complimentary partible mold elements. The material can be further heated and either vacuum molded or compression molded to a preselected shape. It will be appreciated that difficulty is encountered in handling such heated sheet stock because of the tacky, adhesive and cohesive nature of the heated FXLPO material. Quite commonly in manually handling the heated FXLPO panel, portions thereof stick together prior to proper positioning in the mold, hence resulting in a situation where an acceptable product can not be manufactured and material is wasted. Additionally, because of the clamping of the peripheral boundary of the panel in the mold parting line a great deal of waste flashing is created and must be removed. This, of course, uneconomically increases labor costs and material costs.

The problems noted above are common in forming various pads for sports and athletic equipment such as, for example, hip pads, thigh pads, and knee pads for football equipment. The laterally extending flashing problem in forming such pads is particularly troublesome from a labor and wasted material point of view.

Present hip pad configurations for use with football equipment, generally have substantially raised, somewhat centrally located portions extending outwardly from a base portion. With the above-described manufacturing techniques currently employed, it is expensive to form such raised portions of a material which is not the same as the material of the base portion of the hip pad. That is, because of the difficulty in handling the tacky, hot sheet stock and the problem of accurately manually positioning, and indexing, a different material unto such a tacky material, such pads are unitarily formed from a single piece of sheet stock. It would be desirable to have a process wherein such hip pads could be formed with the raised portion and base portion being of different materials.

In manufacturing thigh pads by the above process there currently is a problem with regard to unacceptable entrapment of air during forming and also difficulty in properly indexing the components used to form these pads. Such thigh pads typically would be formed by first positioning a heated panel of cross-linked, foamed polyolefin in a mold portion, followed by positioning a rigid plastic insert upon the preheated panel. This, in turn, would then be followed by positioning another panel of heated, foamed, cross-linked polyolefin onto the plastic insert in a manner so as to both encapsulate the insert between the two panels, and join the panels at their periphery. The materials would then be peripherally clamped at a mold parting line. This technique, because of the adhesive nature of the heated panels, obviously creates an air entrapment problem if the air is not removed as the laminate is being built up. The removal of such air when handling the sticky, heated panels is indeed, a difficult task. The entrapped air then creates air pockets during molding, resulting in a product which could be unacceptable. Indexing is also quite difficult when one considers the sticky, adhesive and cohesive characteristics of the FXLPO which is being handled. Both of these problems contribute to poor quality, increased labor costs and increased wasted material.

Thus it will be seen that there is a need in the art for providing a process wherein products can be formed without encountering the undesired sticking problem which results when handling heated, foamed, cross-linked polyolefin. A process is also needed wherein the undesired formation of laterally extending flashing during the molding operation is virtually eliminated. A process is also needed wherein laminates can be formed such as, for example, thigh pads without encountering severe air entrapment problems between the various layers.

DISCLOSURE OF THE INVENTION

In accordance with the present invention an improved process is provided which satisfies the above indicated needs in the art.

In accordance with one feature of the present invention a process is provided for forming a soft resilient self-supporting energy-dissipating article in a mold having partible mold portions, the mold when in a closed position, defining an article forming cavity which includes a smooth arcuate edge and said mold having a peripheral parting surface, the process comprises: cutting sheet stock of foamed resilient cross-linked polyolefin into preforms inherently having a somewhat rough non-arcuate edge, said polyolefin being at least capable of being sufficiently thermoformed, or molded, to allow such edge to be formed into an arcuate smooth edge, and said preforms, in plan view, having in one embodiment a peripheral configuration, when in a relaxed condition, substantially corresponding to the peripheral shape of the cavity in plan peripheral view; at about room temperature, positioning a sufficient number of said preforms and, optionally, at least one insert into a mold portion so that upon closing and heating the mold said preform or preforms and optional insert are placed in gentle compressive contact with the cavity and are substantially confined within said cavity without lateral projection into said peripheral parting surface; closing the mold and heating the closed mold for a sufficient period of time to allow said non-arcuate, rough edge of said polyolefin to be thermoformed (heat formed) into a smooth, arcuate edge by contact with the smooth arcuate edge of said mold cavity. When plural preforms are used and/or said optional insert is employed, the heating is sufficient to form a bonded unitary article.

In another embodiment, e.g. when the mold cavity is arcuate in plan view, the preform can be cut as a generally rectilinear member and the member bent when positioning in the mold as opposed to the previous embodiment where it can be directly positioned in the mold cavity without significant bending.

In accordance with another feature of this invention an article of manufacture is provided which is a laminate comprised of a first portion of a foamed cross-linked polyolefin and a second portion of a foamed cross-linked polyolefin tenaciously bonded to said first portion, said second portion having a density greater than said first portion. In accordance with another feature of this invention, such laminate carries fastening means and is employed as a cushioning means, e.g. internally of protective headgear like the jaw pad in a football helmet.

In accordance with another feature of this invention there is provided a method for forming a solid self-supporting resilient cross-linked, foamed moldable polyolefin into a soft, energy-dissipating article in a mold having partible mold portions, said mold, when in a closed position defining an article forming cavity and having a peripheral parting surface, the method comprising: cutting stock of said polyolefin into preforms; at about room temperature positioning a sufficient number of said preforms, and, optionally, at least one insert, into said mold so that upon closing said mold and heating same, said mold cavity is filled with said sufficient number of preforms, and optional insert, tut without either, or any, laterally extending into said peripheral parting surface; closing said mold and heating said closed mold containing said preforms, and optional insert, for a sufficient period of time for said preforms to conform to the adjacent mold cavity and said optional insert, when present, to bond to an adjacent portion of at least one of said sufficient number of preforms and thereby form a bonded, single piece article which is substantially free of flashing.

In accordance with another feature of this invention, a laminated article is provided comprising a first layer of foamed cross-linked polyolefin and a second layer of material overlaying said first layer of polyolefin, said second layer carrying perforate indicia and a portion of said first layer extending into said perforate indicia of said second layer. When different colored layers are employed the configuration can provide attractive identification and aesthetic appeal.

BRIEF DESCRIPTION OF THE DRAWINGS

The present invention will become more apparent by reference to the drawings wherein.

DETAILED DESCRIPTION OF THE INVENTION

As previously indicated the present invention contemplates the use of the foamed cross-linked polyolefin (FXLPO) material in the form of a sheet or bun-stock. Such materials are readily commercially available and are supplied by Dynamit Nobel of America, Inc. under the trademark TROCELLEN, and by Monarch Rubber Co., under their designation Evalite. The polyolefins can be homopolymers of ethylene or homopolymers of propylene and/or copolymers of ethylene and/or propylene with copolymerizable monoolefinically unsaturated monomers such as, for example, vinyl acetate. One such copolyxer which is widely commercially available is a copolymer of ethylene and vinyl acetate, typically with up to about 30% by weight of vinyl acetate as the comonomer. These materials are cross-linked by irradiation or by the use of chemical cross-linking agents such as the peroxides and hydroperoxides. Foaming is accomplished by using any of many well-known chemical or physical foaming agents. The (FXLPO) materials contemplated for use in the present invention obviously are not cross-linked to the extent that they are no longer formable. That is, the materials employed should only be partially cross-linked and the cross-linking should allow for the materials to be put into a mold and possess sufficient moldability, or deformability, when heated so that at least a rough cut edge can conform (flow or deform) to a smooth arcuate surface of the mold, whereby an article can be formed which has smooth edges rather than rough cut edges. These materials generally have high heat resistance, good fatigue resistance and good resistance to a wide variety of environmental conditions. In general the densities of the foamed cross-linked polyolefins (FXLPO) employed can vary over a wide range. Quite outstanding results will be obtained using materials having densities in the range of about 2 to about 10 or 12 pounds per cubic foot.

Figure 1:
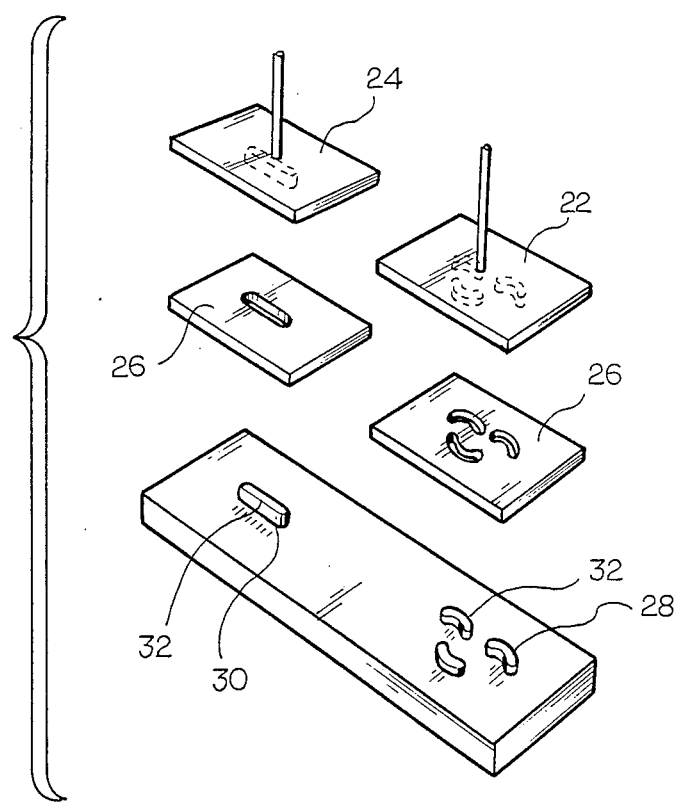
FIG. 1 illustrates the cutting of sheet stock into preforms.
Figure 6:
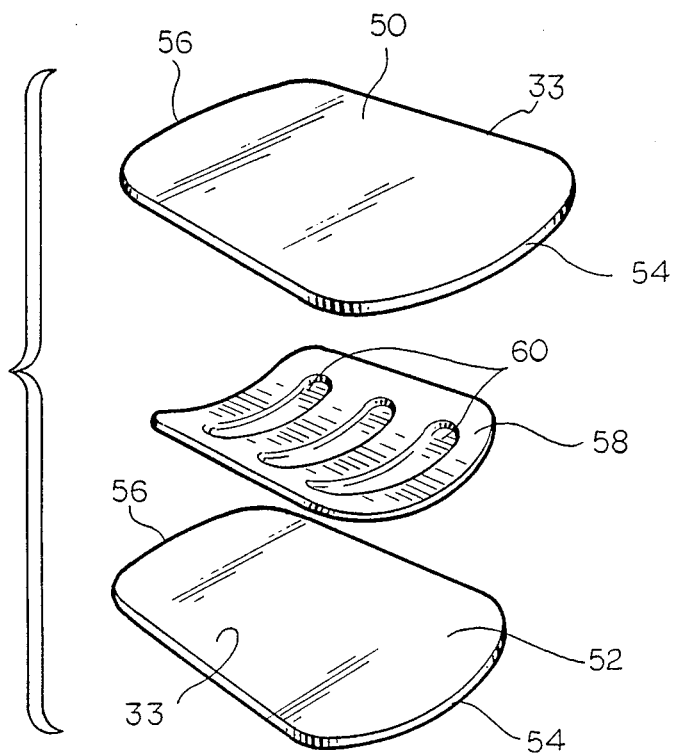
FIG. 6 illustrates the preforms and an insert employed in accordance with the present invention to form a thigh pad.
Figure 5:
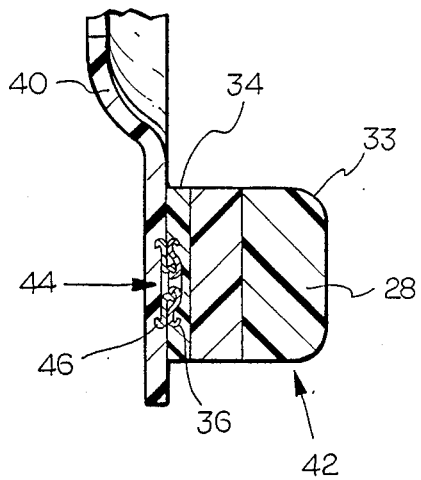
FIG. 5 is a sectional view taken along the line 5—5 of FIG. 4.
Figure 4:
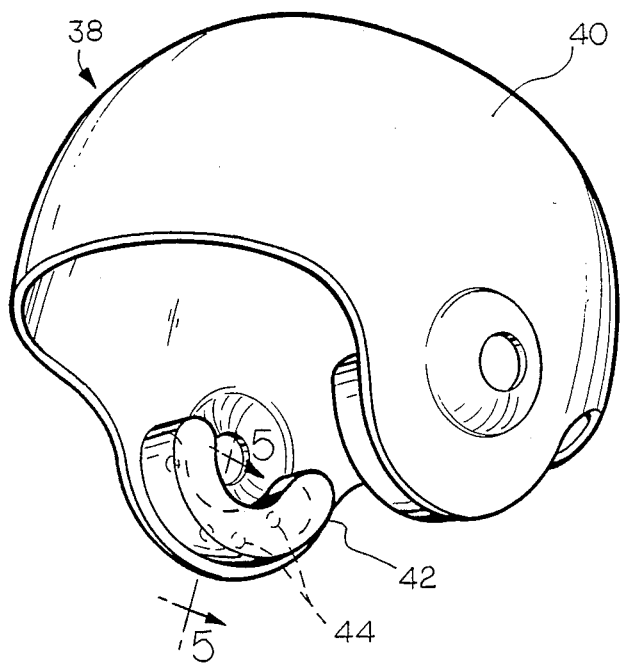
FIG. 4 is a three dimensional representation of a protective head gear which is provided with the article shown in FIG. 3; 15
Figure 2:
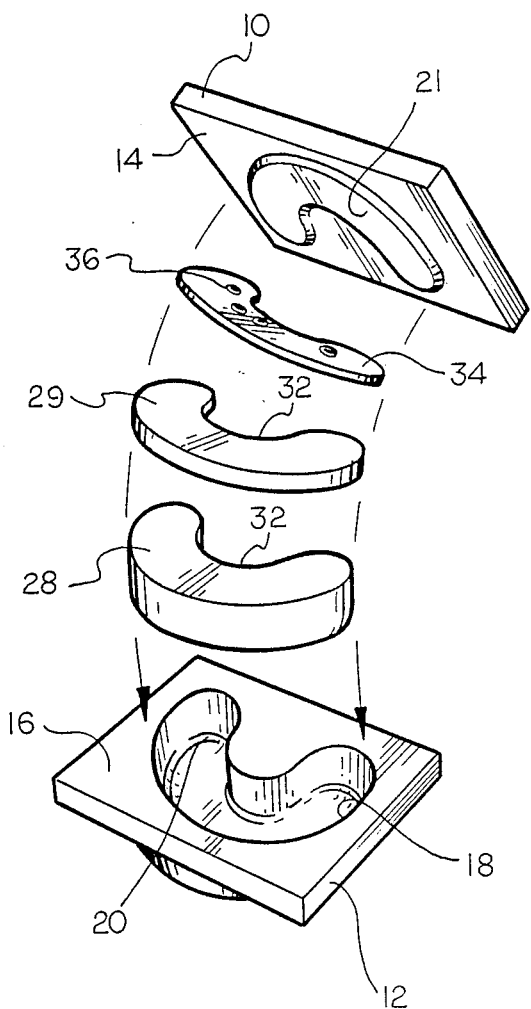
FIG. 2 illustrates a mold, preforms and an insert which are used in accordance with the method of this invention.

Referring to FIGS. 1-5, sheet stock 26 of the FXLPO material is first cut, for example using a die cutter 22, to form preforms 28. Molding of a preform, or a plurality of preforms either with or without the use of an insert, is effected by the use of metallic partible molds, respectively 10 and 12. Partible mold portion 12 includes an article forming cavity 18, which as seen in FIG. 2, is generally arcuate, or C-shaped, in plan view. Cavity 18 is so formed that its lower edges 20 are smooth and rounded so as to produce a more comfortable and aesthetically appealing product. When in a closed position the peripheral parting surfaces 14 and 16 of the mold are brought into intimate contact with each other. Partible mold portion 10 is provided with an inwardly (or downwardly) projecting molding surface 21 which upon closing snugly nests within cavity 18 and defines an article molding surface.

At least one preform 28 is employed which, in plan view, has a peripheral configuration substantially corresponding to the peripheral shape of cavity 18 in plan view. That is both cavity 18 and preform 28 are substantially the same in plan peripheral view. Alternatively, however, a preform can be cut which is generally a rectilinear preform 30 by use of a suitable cutting die 24. When a rectilinear member 30 is employed, it will need to be bent before it can be positioned within mold cavity 18. This is in contrast to the use of the C-shaped preform 28 which may be substantially directly placed within cavity 18. In either case, however, because of the cutting operation, the preforms are generally provided with rough cut edges 32. Of course, for aesthetic purposes and comfort when used in contact with the skin, these rough edges need to be formed into smooth rounded edges in the mold.

In referring to FIG. 2 alternate options of the present invention become apparent. In FIG. 2 plural preforms are employed, namely a preform 28 and a preform 29 which generally is of lesser thickness. These preforms obviously can be tailored for preselected end uses by using FXLPO materials which have different densities. When different densities are not desired, a single preform 28 may be employed.

FIG. 2 also illustrates the optional use of a insert 34 which integrally carries suitable fastening means 36. Fastening means 36 can be any of a numerous variety of available fasteners, including metallic fasteners having orifices for snapping engagement with complementary fastening means on another article, or the fastening means can be Velcro material. There may, of course, be no need to employ any insert or an insert which carries fastening means depending on the desired end use.

Figure 3:
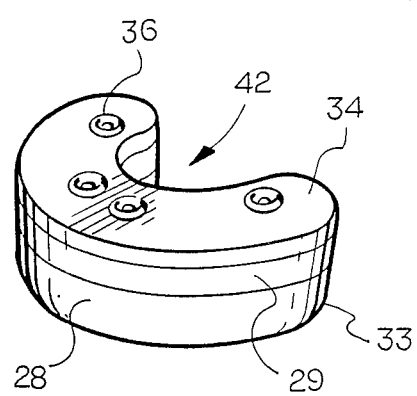
FIG. 3 is a three dimensional representation of one of the products formed in accordance with the present invention.

In the embodiment set forth in FIG. 3, a soft, resilient, self-supporting energy dissipating jaw pad 42, which will be employed inside of a protective head gear such as, for example, football helmet 38 is illustrated. Such a pad needs to possess optional insert 34 which carries appropriate fastening means 36. Generally, insert 34 may be of any convenient material depending on the ultimate use including plastics (both thermoplastic and thermoset) or metals, for example aluminum, and paperboard. The insert can also be a reinforcing mat such as a glass fiber reinforcing mat or a polymeric reinforcing mat such as a polyethylene terephthalate fibrous mat. The insert may, or may not, include the integral fastening means 36 depending on the ultimate product use. The insert may take the form of a sheet, either curvilinear or planar, a film or a fabric, either woven or nonwoven. Outstanding products have been produced in accordance with this invention by using inserts whose resistance to flexure has been greater than that of the FXLPO material used for the preform(s), i.e. the insert generally will be less elastic or more rigid. For the jaw pad example, the insert may be a polyolefin, preferably a cross-linked polyolefin and most desirably a foamed cross-linked polyolefin but one which has slighter greater density then the preform 28, and optional preform 29.

Preform 28 is positioned within cavity 18, and is overlayed with optional preform 29. Insert 34 is then positioned, or overlayed, on top of preform 29. Partible mold 10 is then brought into contact with the lower partible mold portion 12. The article defining molding surface of the formed cavity (including the snugly nesting molding surface 21) and the preform, or preforms, and optional insert, are selected so that upon closing the mold, preform 28, or optional preform 29 and the optional insert 34 are placed in gentle compressive contact with the cavity. Additionally, whether a single preform is used or plural preforms, either with or without an insert, the gently compressed material to be molded and/or bonded is within the article defining surfaces of the mold and are substantially confined within the mold and its cavity forming surface without laterally projecting into the peripheral parting surfaces 14 and 16 of mold halves 10 and 12.

The closed mold containing the molding materials 28, 29, 34 is then heated in any convenient manner such as, for example, in an air heated oven. The molds can also be heated by putting them in contact with any suitable heat transfer medium or for that matter designing the molds to allow the passage of a heat transfer medium therethrough. As previously indicated, it is generally desired to convert rough cut edges 32 to a smooth curved arcuate edge 33 by molding the rough cut edge 32 in contact with the smooth edge 20 of the cavity 18. Consequently, the mold and materials to be molded, are heated to a temperature and for a time at least sufficient to effect that objective, that is for the rough edge to be molded and formed into a curved smooth edge. Typically, the heating is done at a temperature in the range of about 250° F. to about 500° F. for about 1 to about 20 minutes. During such heating not only are rough edges converted to smooth edges but in general the entire preform 28 takes on the configuration of the molding surfaces and results in the production of a much smoother aesthetically pleasing article.

After cooling, final article 42 is removed from the mold. This article, which is represented in the form of a C-shaped member, is employed inside of protective headgear like football helmet 38, as a safety and energy absorbing member. Headgear 38 includes a rigid protective shell 40 of a suitable polymeric material and the article 42 is disposed internally of shell 40 as a jaw pad. The jaw pad 42 is attached to the shell 40 by suitable inter-engaging fastening means, generally designated 44, one part 46 of which is carried by the shell 40 and the other part 36 of which is carried by jaw pad 42. The fastening means 44 can best be seen in FIG. 5 which shows the attachment of jaw pad 42 to shell 40 by the inter-engaging fastening means 46 and 36, respectively. In the preferred embodiment the fastening means 44 will be conventional metallic snap fasteners.

Thus from the above it will be apparent that the present method provides a technique whereby a variety of FXLPO materials, e.g. of varying densities, can be tenaciously heat bonded to each other and/or molded into finished articles having smooth surfaces. By properly selecting at least one preform (or a plurality of preforms) either with or without an insert, to fill the cavity so that the preform, or preforms and optional insert are placed in gentle compressive contact with the molding surfaces but are confined within the cavity and without laterally projecting into the peripheral parting surface, production economies are obtained. There is no flashing which must be removed because the materials do not significantly enter the peripheral parting surface, or line, of the mold during molding.

Figures 7, 8, 9:
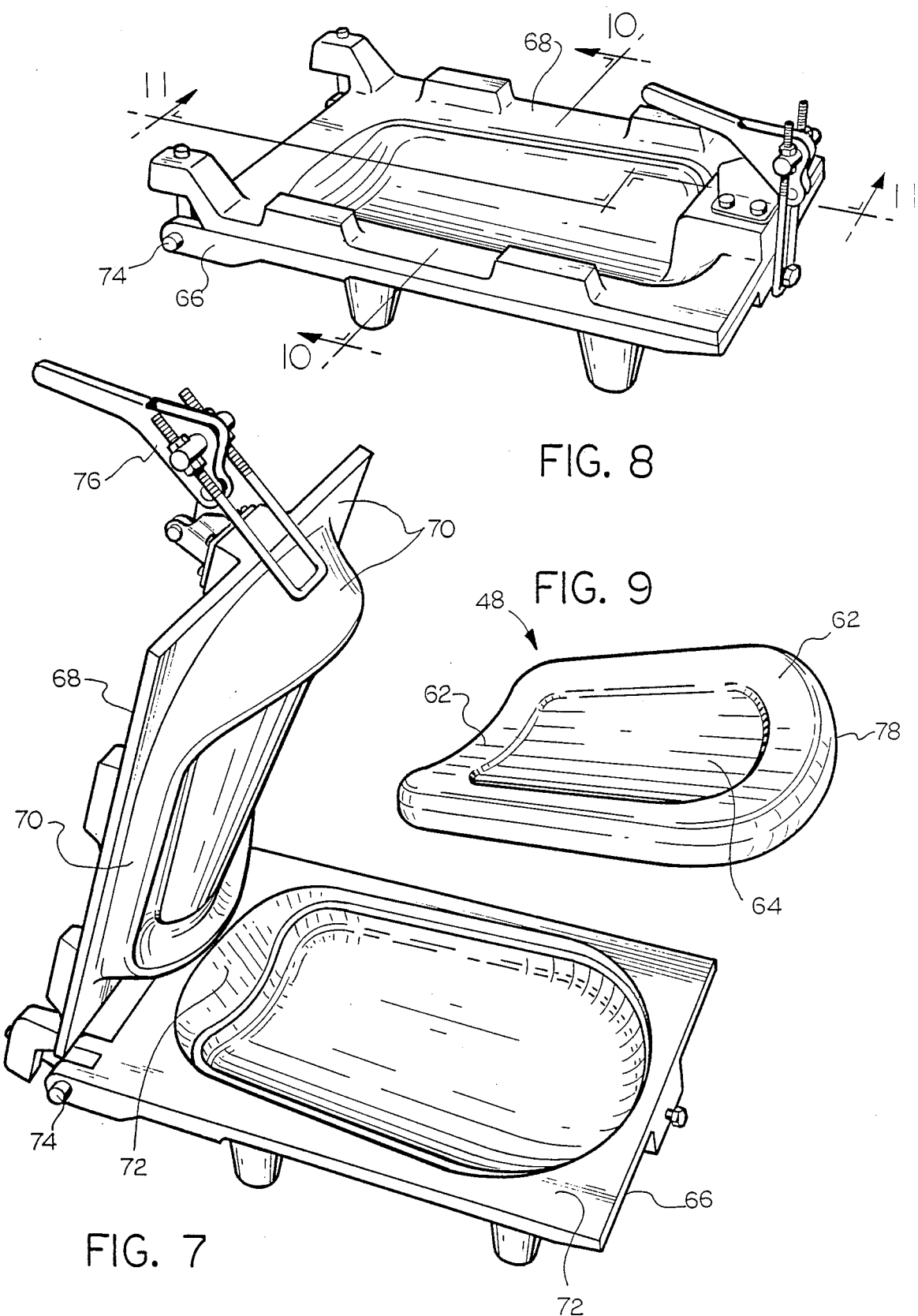
FIG. 7 is a three dimensional representation of a mold used to form such a thigh pad.
FIG. 8 shows the mold of FIG. 7 in a closed position and containing the preforms and insert of FIG. 6.
FIG. 9 is a three dimensional representation of a thigh pad formed in accordance with the present invention.
Figure 10:
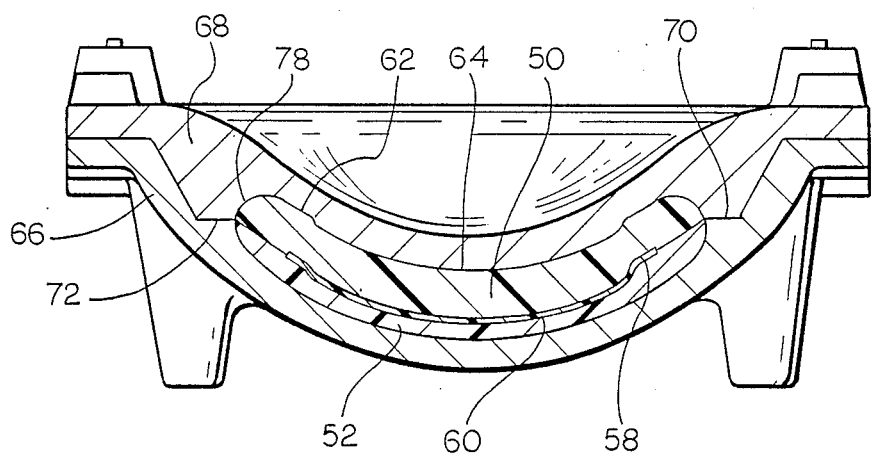
FIG. 10 is a sectional view taken along the line 10—10 of FIG. 8 and shows a thigh pad being molded.
Figure 11:
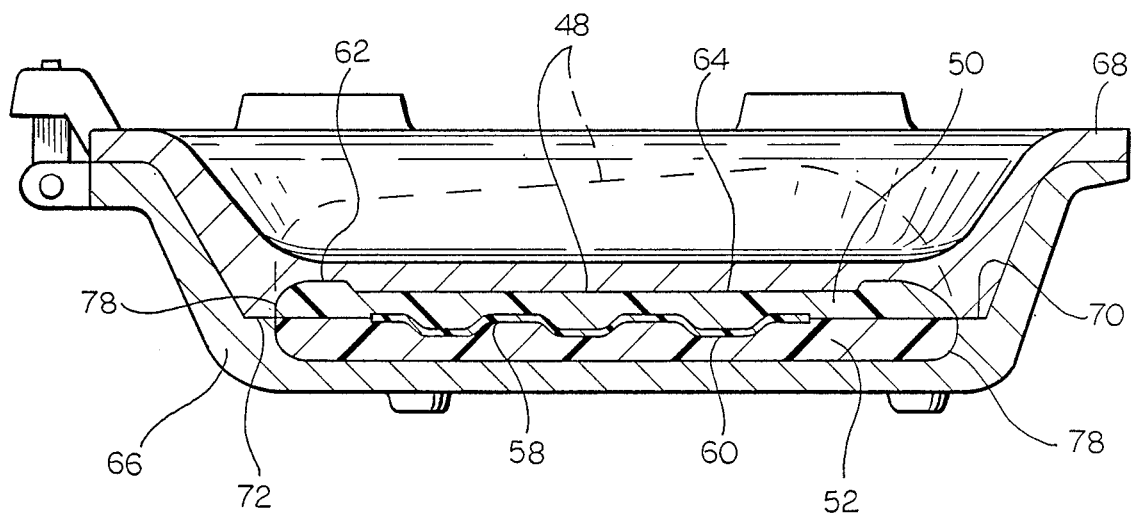
FIG. 11 is a sectional view taken along the line 11—11 of FIG. 8 also showing the molding of a thigh pad.

Referring now to FIGS. 6-11, another embodiment of the invention is illustrated wherein a thigh pad 48 conventionally used with football equipment is fabricated. The thigh pad is generally illustrated in FIG. 9 and includes a somewhat centrally disposed recessed panel 64 and a slight annular collar 62. The thigh pad in transverse cross section is generally concave. Thigh pad 48 is formed from two preforms, best seen in FIG. 6, 50 and 52 respectively with the upper portions 54 of each of the preforms being somewhat larger than the lower, or bottom portions, 56 and the sides thereof gradually tapering from upper portion 54 to lower portions 56. Preforms 50 and 52 are each formed from a foamed cross-linked polyolefin and the specific materials of each preform may be the same or different. In addition to the preforms, an insert 58 is employed with the insert having disposed along its longitudinal dimension a plurality of downwardly protruding ribs 60. In transverse cross section, both through the main body portion of insert 58 and through ribs 60, the insert is upwardly concave. The preform, 50, which is disposed upwardly of the upwardly concave insert generally will be of a slightly smaller area than will the lower preform, 52.

Preforms 50 and 52 are cut from a stock with a cutting die and also include rough edges 33. Insert 58 is generally formed of a rigid non-foamed material, preferably an organic polymer (such as, for example, polyvinyl chloride or the like) or a metal (like aluminum) and, obviously, adds strength and rigidity to the thigh pad. Outstanding results will be obtained using a rigid polyvinyl chloride insert, e.g. a curvilinear sheet with a thickness of about 1/16 to about ⅛ inch. Insert 58 becomes substantially totally enveloped and encapsulated between preforms 50 and 52 and preforms 50 and 52 in turn become tenaciously peripherally bonded to each other and, depending on its composition, to insert 58 during the molding operation generally illustrated in FIGS. 7, 8, 10 and 11.

The molds include partible mold halves, 66 and 68, which mold halves are pivotally mounted, as by rod 74, and can be closed and clamped by the clamping mechanism 76. The mold includes peripheral parting surfaces 70 and 72, respectively. The preforms and insert are such that preforms 50 and 52 are gently compressed within the mold cavity upon closing of the mold halves. The preforms are also substantially confined within the molding cavity without lateral projection into the mold parting surfaces, e.g. 70 and 72. This is best exemplified in FIGS. 10 and 11 wherein it will be seen that upon first positioning the lower preform 52 into the partible mold 66 and then, overlaying, insert 58 thereon, followed by the positioning of preform 50 thereover, the insert and preforms are confined within the article defining surfaces of the mold cavity and do not project laterally into the mold parting surfaces. Upon heating, small portions of preforms 50 and 52 may tend to creep into the mold parting surfaces, but if this happens the amount is so insignificant that virtually no unacceptable flashing forms and that the final article 48 still does not need to be trimmed. The closed mold with the insert and preforms are heated at a temperature for a time sufficient such that rough edges, like edges 33, can flow and form into the smooth arcuate edges 78 by contact with the smooth curved molding surfaces.

Because the preform or preforms, and optional inserts, are all positioned in a mold while the insert and preforms are at room temperature, there is little difficulty in positioning them in the proper place because they are not in a heated or sticky state when handled. This provides an improvement over the practices noted previously. This convenient indexing is itself a great benefit but it also appears that undesired air entrapment is also virtually eliminated.

It will be recalled that hip pad configurations were indicated to have a raised centrally located portion but because of the handling of heated panels it is expensive and difficult to form raised portions on the hip pad by inserting a material which is not the same as the material of the base portion. The difficulty in handling a tacky heated sheet stock insert is the cause of the problem. In accordance with the present invention, because the FXLPO materials are positioned within the mold at room temperature, this problem is obviated. The method provides an opportunity to easily form the raised portions of a hip pad from a material which is not the same as the base material.

Based on the foregoing, it will be apparent that many options exist for taking advantage of the present invention. For example, and, although not shown, perhaps best appreciated by reference to the embodiment described with respect to FIG. 2, at least one of the preforms 29 and/or the insert 34 can be provided with perforate indicia so that upon closing of the mold, and molding by heating, foamed cross-linked polyolefin from a different preform can enter into the perforate indicia. This perforate indicia can take the form of any suitable opening, or openings, which defines lettering and/or a suitable design. The lettering obviously can be used for identification and/or advertising purposes. The design can similarly be a manufacturer's logo and function similarly. In this way, and especially in the case when different colors are used in the preform and/or insert, the laminated configuration can provide an attractive identification and aesthetically appealing structure. Thus, for example, if it were desired to form, in accordance with FIG. 2, an article (other than a jaw pad or one needing insert 34) having some distinctive indicia thereon, preform 29 would have an opening or openings made through it. The opening(s) would, for example, be a name so that when molded FXLPO material from preform 28 would enter the openings and provide a contrasting indicia on the upper surface of preform 29. Use of contrasting colors for preforms 29 and 28 provides an opportunity for many appealing structures.

In a like manner, insert 34 could be provided with perforate indicia (either with or without fastening means 36) so as to allow the adjacently downwardly FXLPO material from a preform 29 (or 28 depending on how many are used) to form the identification or design indicia by entering and generally heat bonding to the indicia defining surfaces.

While no vents are shown in the molds, it is generally preferred to provide appropriately arranged small vent holes. Additionally, in practicing this invention, it has been found that non-cross linked foamed polyolefins are generally not satisfactory for the present purposes because they contract and soften and flow when heated. Outstanding shock energy absorbing materials have been produced with materials indicated above and without the utilization of any polyurethane or foamed polyurethane or any precursors to a polyurethane or foamed polyurethane. Additionally it should be noted that tenacious teat bonding between FXLPO materials is effected without the necessity for dipping any of the preforms or inserts into organic peroxide solutions.

Having described the invention it will of course be apparent that modifications are possible which pursuant to the patent statutes and laws do not depart from the spirit and scope thereof.

What is claimed is:

1. A method for forming a soft, resilient, self-supporting, energy-dissipating article in a mold having partible mold portions, said mold, when in a closed position, defining an article forming cavity which includes a smooth arcuate edge and said mold having a peripheral parting surface, said method comprising: cutting sheet stock of foamed, cross-linked polyolefin into preforms having a rough edge, said polyolefin being at least capable of being sufficiently thermoformed to allow a rough edge to be formed into a smooth edge, and said preforms, in plan view, having a peripheral configuration substantially corresponding to the peripheral shape of the cavity in plan peripheral view; at about room temperature, positioning a sufficient number of said preforms and, optionally at least one insert, into a mold portion so that upon closing and heating the mold said preform, or preforms, and optional insert are placed in compressive contact with the cavity and are substantially confined within said cavity without laterally projecting into said peripheral parting surface; heating a closed mold containing said preforms and optional insert for a sufficient period of time to allow said rough edge of said polyolefin to be formed into a smooth edge by contact with said smooth edge of said mold cavity and wherein, when plural preforms are used, and/or said optional insert is employed, said heating is done at a sufficient temperature for a sufficient time to form a bonded unitary article.

2. The method of claim 1, wherein a single preform is so positioned in said mold portion.

3. The method of claim 1 wherein at least two such preforms are so positioned.

4. The method of claim 1 wherein at least one insert is positioned in a mold portion.

5. The method of claim 1 wherein said insert carries integral fastening means.

6. The method of claim 4 wherein said insert is a nonfoamed rigid organic polymer.

7. The method of claim 4 wherein said insert is a foamed, cross-linked polyolefin having a greater density than the density of said preform.

8. The method of claim 7 wherein said preform has a density of about 2 to about 8 $\#/Ft^3$ and said insert has a density in excess of about 4 $\#/Ft^3$.

9. The method of claim 1 wherein said polyolefin is a closed cell polyethylene.

10. The method of claim 5 wherein said preform and said insert are generally C-shaped.

11. The method of claim 1 wherein said heating is also done for a sufficient period of time that the outwardly exposed surface of said preform becomes smoother.

12. A method for forming a solid self-supporting resilient cross-linked, foamed moldable polyolefin into a soft, energy-dissipating article in a mold having partible mold portions, said mold, when in a closed position defining an article forming cavity and having a peripheral parting surface, the method comprising: cutting stock of said polyolefin into preforms; at about room temperature positioning a sufficient number of said preforms, and, optionally, at least one insert, into said mold so that upon closing said mold and heating same, said mold cavity is filled with said sufficient number of preforms, and optional insert, but without either laterally extending into said peripheral parting surface; closing said mold and heating said closed mold containing said preforms, and optional insert, for a sufficient period of time for said preforms to conform to the adjacent mold cavity and said optional insert, when present, ±o bond to an adjacent portion of at least one of said sufficient number of preforms and thereby form a bonded, single piece article, said method thereby producing ar article which is substantially free of flashing.

13. The method of claim 12 wherein said sufficient number of preforms is one.

14. The method of claim 12 wherein said sufficient number of preforms, and said optional insert fill said mold cavity at about room temperature when said mold is closed and prior to said heating.

15. The method of claim 13 wherein an insert is positioned in said mold so as to be enveloped by at least two contacting preforms.

16. The method of claim 12 wherein at least one insert is employed, said insert having means thereon for fastening said insert and single piece article to a member carrying complementary means for interengageably fastening to said insert fastening means.

17. The method of claim 16 wherein said insert's fastening means comprises an orifice.

18. The method of claim 12 wherein neither said optional insert or any of said sufficient number of preforms is formed of a polyurethane or a polyurethane forming precursor.

19. The method of claim 12 wherein (i) at least one of said number of preforms and/or said insert are provided with perforate indicia and wherein said perforate indicia carrying preform and/or insert are so positioned in said mold that upon closing said mold and heating, foamed cross-linked polyolefin from a preform, enters into said perforate indicia.

20. The method of claim 19 wherein said foamed cross-linked polyolefin which enters said perforate indicia is of a color different than said preform and/or insert provided with said perforate indicia.

21. A method for molding a foamed cross-linked polyolefin in a mold having partible mold portions comprising positioning said foamed cross-linked polyolefin while substantially at about room temperature in a cavity portion of said mold, closing said partible mold portions and heating said mold and said polyolefin so as to mold and conform outer portions of said polyolefin to the surface of the mold cavity, the amount of polyolefin being such that during said heating substantially no polyolefin extends into the mating parting surfaces of the closed partible mold portions.

22. The method for forming a molded foamed cross-linked polyolefin article which is substantially free of flashing in a mold having partible mold halves which when closed define a cavity and a contiguous peripheral mold parting line comprising: positioning, while at substantially room temperature, foamed cross-linked polyolefin into a cavity portion of said mold; closing said mold; heating said mold for a sufficient period of time to form said article.

23. The method of claim 22 wherein the amount of polyolefin material positioned in the mold is insufficient to substantially extend into said parting line upon closing said mold and heating.

* * * * *